(12) United States Patent
Miyazawa et al.

(10) Patent No.: US 6,346,140 B2
(45) Date of Patent: Feb. 12, 2002

(54) POROUS SOLID FOR GAS ADSORPTION SEPARATION AND GAS ADSORPTION SEPARATION PROCESS EMPLOYING IT

(75) Inventors: Kohji Miyazawa; Shinji Inagaki, both of Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 0 days.

(21) Appl. No.: 09/820,940

(22) Filed: Mar. 30, 2001

(30) Foreign Application Priority Data

Mar. 31, 2000 (JP) ........................................ 2000-099564

(51) Int. Cl.[7] ........................... B01D 53/02; C01B 37/00
(52) U.S. Cl. ........................... 95/139; 95/143; 423/703
(58) Field of Search ................................ 423/701, 702, 423/703, 704, 705, 706; 502/407; 95/139, 143, 902; 96/108

(56) References Cited

U.S. PATENT DOCUMENTS

| 5,382,558 A | 1/1995 | Inagaki et al. | 502/407 |
|---|---|---|---|
| 5,508,081 A | 4/1996 | Inagaki et al. | 428/116 |
| 5,599,759 A | 2/1997 | Inagaki et al. | 502/407 |
| 5,622,684 A | 4/1997 | Pinnavaia et al. | 423/702 |
| 5,707,598 A | 1/1998 | Inagaki et al. | 423/328.2 |
| 5,849,258 A | 12/1998 | Lujano et al. | 423/700 |
| 5,876,690 A * | 3/1999 | Mou et al. | 423/702 |
| 5,902,564 A * | 5/1999 | Lujano et al. | 423/702 |
| 6,129,904 A * | 10/2000 | Von Thienen et al. | 423/627 |

FOREIGN PATENT DOCUMENTS

| CN | 1208718 | 2/1999 |
|---|---|---|
| JP | 9-295811 | 11/1997 |
| WO | WO 01/38223 A1 * | 5/2001 |

* cited by examiner

Primary Examiner—David A. Simmons
Assistant Examiner—Frank M. Lawrence
(74) Attorney, Agent, or Firm—Oblon, Spivak, McClelland, Maier & Neustadt, P.C.

(57) ABSTRACT

A gas adsorption separation process characterized by adsorption separation of components in a gas by contacting the gas with a porous solid which is a porous solid having an X-ray diffraction pattern with at least one peak at a diffraction angle corresponding to a d value of 1 nm or greater; and having a nitrogen adsorption isotherm measured at liquid nitrogen temperature with at least one section where the change in nitrogen adsorption in terms of the volume of nitrogen under standard conditions is 50 ml/g or greater with a relative vapor pressure change of 0.1 in a relative vapor pressure range of 0.2–0.8;

wherein the porous solid possesses mesopores with a median pore size of 2–50 nm in the pore size distribution curve and pore walls that are porous.

19 Claims, 10 Drawing Sheets

STANDARD ISOTHERM DATA

| RELATIVE PRESSURE (P/Po) | AMOUNT OF ADSORPTION (V) (mmol/m²) | NUMBER OF ADSORPTION LAYER V/Vm | THICKNESS OF ADSORPTION FILM (t) (nm) |
|---|---|---|---|
| 0.001 | 4.0 | 0.390 | 0.138 |
| 0.005 | 5.4 | 0.527 | 0.186 |
| 0.010 | 6.2 | 0.605 | 0.214 |
| 0.020 | 7.7 | 0.751 | 0.266 |
| 0.030 | 8.5 | 0.829 | 0.293 |
| 0.040 | 9.0 | 0.878 | 0.311 |
| 0.050 | 9.3 | 0.907 | 0.321 |
| 0.060 | 9.4 | 0.917 | 0.325 |
| 0.070 | 9.7 | 0.946 | 0.335 |
| 0.080 | 10.0 | 0.975 | 0.345 |
| 0.090 | 10.2 | 0.995 | 0.352 |
| 0.100 | 10.5 | 1.024 | 0.362 |
| 0.120 | 10.8 | 1.053 | 0.373 |
| 0.140 | 11.3 | 1.102 | 0.390 |
| 0.160 | 11.6 | 1.131 | 0.400 |
| 0.180 | 11.9 | 1.161 | 0.411 |
| 0.200 | 12.4 | 1.209 | 0.428 |
| 0.220 | 12.7 | 1.239 | 0.438 |
| 0.240 | 13.0 | 1.268 | 0.449 |
| 0.260 | 13.3 | 1.297 | 0.459 |
| 0.280 | 13.6 | 1.326 | 0.470 |
| 0.300 | 13.9 | 1.356 | 0.480 |
| 0.320 | 14.2 | 1.385 | 0.490 |
| 0.340 | 14.5 | 1.414 | 0.501 |
| 0.360 | 14.8 | 1.443 | 0.511 |
| 0.380 | 15.1 | 1.473 | 0.521 |
| 0.400 | 15.5 | 1.512 | 0.535 |
| 0.420 | 15.6 | 1.521 | 0.539 |
| 0.440 | 16.1 | 1.570 | 0.556 |
| 0.460 | 16.4 | 1.599 | 0.566 |
| 0.500 | 17.0 | 1.658 | 0.587 |
| 0.550 | 17.8 | 1.736 | 0.615 |
| 0.600 | 18.9 | 1.843 | 0.652 |
| 0.650 | 19.9 | 1.941 | 0.687 |
| 0.700 | 21.3 | 2.077 | 0.735 |
| 0.750 | 22.7 | 2.214 | 0.784 |
| 0.800 | 25.0 | 2.438 | 0.863 |
| 0.850 | 28.0 | 2.731 | 0.967 |
| 0.900 | 37.0 | 3.608 | 1.277 |

POROUS SOLID FOR GAS ADSORPTION SEPARATION AND GAS ADSORPTION SEPARATION PROCESS EMPLOYING IT

BACKGROUND OF THE INVENTION

1. Field of the Invention

The present invention relates to a porous solid for adsorption separation of components in gases, and to an adsorption separation process employing it for components in gases.

2. Related Background Art

Zeolite, mesoporous substances, silica gel, alumina and the like are among the porous substances of the prior art utilizable for adsorption and separation of components in gases, and each has their unique features, which are described below.

Zeolite-based crystalline porous solids are utilized in a wide range of industrial fields as catalysts and ion-exchangers because of the physical and chemical surface properties of the porous solids. Since zeolite-based crystalline porous solids have an extremely fine uniform structure with a pore size of 0.3–1.3 nm, they exhibit an excellent function in terms of highly selective catalytic reactivity for low molecular weight compounds, etc. and excellent adsorption properties.

The crystalline mesoporous substance (mesoporous solid) with pores in the meso range of 2–50 nm described in Japanese Unexamined Patent Publication HEI No. 8-67578 and elsewhere has a high surface to volume ratio and excellent homogeneity of the porous structure, and it can therefore be used as a selective catalyst or adsorbent for high molecular weight compounds, i.e. compounds with a molecular size approximately equivalent to the pore size, while the molecular diffusion rate is also excellent due to the sizes of the pores.

Amorphous porous solids of silica gel or alumina are usually prepared by sol-gel methods, and structural control can be easily accomplished by using various organic substances as templates. Because such amorphous porous solids have a wide pore size distribution from micropores to mesopores to macropores, the presence of the macropores allows their greatly extended function as an adsorption carrier, while their wide pore size distribution allows their use as adsorption carriers and reaction catalysts for an extremely wide range of organic compounds, from low molecular weight to high molecular weight. Japanese Unexamined Patent Publication HEI No. 9-295811 discloses an amorphous porous solid produced by such a sol-gel method and having micropores, mesopores and macropores distributed according to a fractal rule, and it is stated that the amorphous porous solid can be used as an adsorption carrier or as a packing material for chromatography.

SUMMARY OF THE INVENTION

However, while the extremely fine and uniform microstructure of the aforementioned conventional zeolite-based crystalline porous solids provides high selectivity and adsorption properties for low molecular weight compounds, the fine microstructure also limits their use as catalysts and adsorbents for compounds with bulky molecular structures or high molecular weight compounds, and their low molecular diffusion rate has also presented a problem from the standpoint of efficiency.

On the other hand, while the aforementioned conventional crystalline mesoporous substances can be utilized as excellent selective catalysts or adsorbents for high molecular weight compounds and their large pore sizes give a high molecular diffusion rate, the relatively large pore sizes and amorphous pore walls also constitute a problem hampering the expression of the specific catalyst and adsorption properties of zeolite and similar materials as molecular sieves.

The aforementioned amorphous porous solids have pores in the full range from micropores to mesopores and even macropores, and can therefore be used as adsorption carriers and catalysts for a wide range of compounds from low molecular weight to high molecular weight, but their drawback is particularly low specific and selective catalytic reactivity and adsorption separation properties for specific compounds.

Thus, none of the conventional porous substances are yet adequate in terms of performance as adsorbents for adsorption separation of specific compounds, and it has been particularly difficult to accomplish adsorption separation of harmful hydrocarbons and global warming-implicated $CO_2$ in exhaust gas in a selective and efficient manner using conventional porous substances as the adsorbents.

It is an object of the present invention, which has been accomplished in light of the aforementioned problems of the prior art, to provide a porous solid for gas adsorption separation, and a gas adsorption separation process employing it, which allow selective and efficient adsorption separation of specific components in gases, such as hydrocarbons and $CO_2$.

As a result of diligent research directed toward achieving this object, the present inventors have discovered that by distributing pore sections (of micropores) in the pore walls themselves separating the pores of crystalline mesoporous substances (mesoporous solids), it is possible to notably improve the adsorption separation performance for specific components in gases, and especially for low molecular weight compounds, thereby accomplishing selective and efficient adsorption separation of the specific components in gases, and the present invention has thus been completed.

The porous solid for gas adsorption separation according to the invention is a porous solid having an X-ray diffraction pattern with at least one peak at a diffraction angle corresponding to a d value of 1 nm or greater; and having a nitrogen adsorption isotherm measured at liquid nitrogen temperature with at least one section where the change in nitrogen adsorption in terms of the volume of nitrogen under standard conditions is 50 ml/g or greater with a relative vapor pressure change of 0.1 in a relative vapor pressure range of 0.2–0.8;

wherein the porous solid possesses mesopores with a median pore size of 2–50 nm in the pore size distribution curve and pore walls that are porous.

The gas adsorption separation process of the invention is characterized by adsorption separation of components in a gas by contacting the gas with a porous solid having an X-ray diffraction pattern with at least one peak at a diffraction angle corresponding to a d value of 1 nm or greater; and having a nitrogen adsorption isotherm measured at liquid nitrogen temperature with at least one section where the change in nitrogen adsorption in terms of the volume of nitrogen under standard conditions is 50 ml/g or greater with a relative vapor pressure change of 0.1 in a relative vapor pressure range of 0.2–0.8;

wherein the porous solid possesses mesopores with a median pore size of 2–50 nm in the pore size distribution curve and pore walls that are porous.

The reason for the notably improved adsorption separation performance by the porous solid of the invention has not been established, but the present inventors believe it to be as follows. Specifically, in the porous solid of the invention, the gas molecules diffuse rapidly through the relatively large mesopores into the interior of the pores. Subsequently, the gas molecules are adsorbed and separated by micropores which are formed on the surface of the mesopores (pore walls) and have a pore size corresponding to the molecular size. As this occurs, the gas molecules are selectively adsorbed and separated (filtered) depending on the gas molecule size and the chemical properties of the porous solid surface. The present inventors believe that it is this rapid diffusion and filtering of the gas molecules simultaneously accomplished in the porous solid of the invention that accounts for the selective and efficient adsorption separation of specific components in the gas (such as carbon dioxide or hydrocarbons) from the other components.

The pore walls of the porous solid of the invention are porous with micropores of a mean size of less than 2 nm, and the total volume of these micropores is preferably at least 0.05 ml/g. The total volume of micropores in the porous solid of the invention is preferably at least 10% of the total pore volume. A porous solid with such a large micropore volume tends to exhibit even further improved adsorption separation performance.

In the porous solid of the invention, at least 60% of the total pore volume excluding the micropores is preferably in a range of ±40% of the median pore size. A mesopore structure with this degree of homogeneity tends to further improve the selectivity for components in gases.

It is preferred for the median pore size of the mesopores in the porous solid of the invention to be from 3 nm to 30 nm, for the mean size of the micropores to be at least 0.2 nm and less than 2 nm, and for the thickness of the pore walls to be at least 2 nm. A porous solid of this type will tend to exhibit even more satisfactory adsorption separation properties.

The gas adsorption separation process of the invention allows selective and efficient adsorption separation of hydrocarbons, $CO_2$ and the like, as mentioned above, and therefore the target component in the gas is preferably at least one selected from the group consisting of carbon dioxide and hydrocarbons.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 5 is a table of data for a standard isotherm.

DESCRIPTION OF THE PREFERRED EMBODIMENTS

Figure 1:
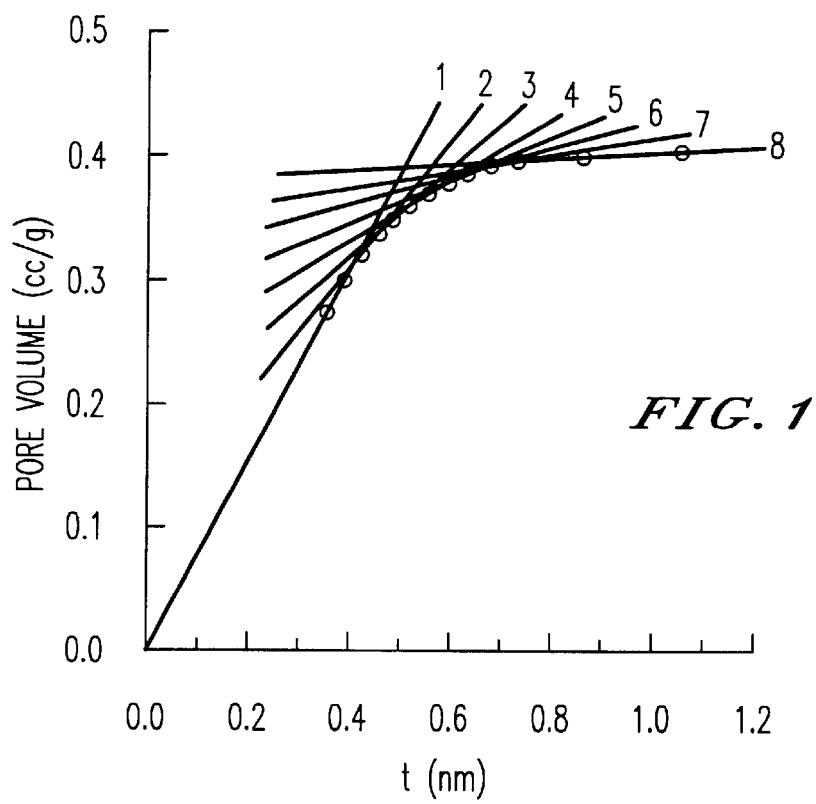
FIG. 1 is a graph showing slopes for each t value block, on a plot of pore volume (V) against thickness (t).

Preferred embodiments of the invention will now be explained in detail.

[Porous Solid for Gas Adsorption Separation of the Invention]

A porous solid for gas adsorption separation according to the invention will be explained first.

(X-ray diffraction pattern)

The porous solid for gas adsorption separation of the invention has an X-ray diffraction pattern with at least one peak at a diffraction angle corresponding to a d value of 1 nm or greater. The regular pore structure exhibits adequately effective adsorption separation properties as a mesoporous solid, while the porous pore walls which are described below impart selective adsorption separation properties.

An X-ray diffraction peak means that the sample has a periodic structure with a d value corresponding to that peak angle. The X-ray diffraction pattern reflects a structure of pores regularly arranged at a spacing of 1 nm or greater. That is, a mesoporous solid with such a diffraction pattern has a uniform pore structure and pore size due to the regularity of the structure represented by that diffraction pattern. More preferably, it has at least one peak at a diffraction angle corresponding to a d value of 5 nm or greater.

(Median pore size, nitrogen adsorption and pore size distribution)

The porous solid for gas adsorption separation of the invention has mesopores with a median pore size of 2–50 nm, preferably 2–30 nm, more preferably 5–30 nm and even more preferably 5–15 nm, in the pore size distribution curve. When such mesopores are present, functional organic compounds of large molecular size can easily enter into the pores so that molecular diffusion can be rapidly accomplished in the pores for efficient adsorption separation.

The above-mentioned pore size distribution curve may be determined in the following manner. Specifically, the pore size distribution curve is a curve representing the derivative of the pore volume (V) with respect to the pore size (D) (dV/dD), plotted against the pore size (D), for example, and the median pore size is the pore size for which the value of dV/dD of the pore size distribution curve is greatest (the maximum peak is exhibited).

This pore size distribution curve is derived from the adsorption isotherm obtained by measurement of the adsorption of nitrogen gas, for example, according to several equations. An example of an adsorption isotherm measurement method is explained below. Nitrogen is the gas most often used for this method.

First, the mesoporous solid is cooled to liquid nitrogen temperature (−196° C.), nitrogen gas is introduced, and the adsorption is determined by fixed displacement or gravimetry. The pressure of the introduced nitrogen gas is gradually increased, and the adsorption of nitrogen gas at each equilibrium pressure is plotted to produce an adsorption isotherm.

The pore size distribution curve can be derived from this adsorption isotherm according to the equation for the Cranston-Inklay method, Dollimore-Heal method, BJH method, etc. For example, if the maximum peak for the pore size distribution curve is at 3.00 nm, the median pore size is 3.00 nm.

The porous solid for gas adsorption separation according to the invention is a porous solid having at least one section wherein the change in nitrogen adsorption (nitrogen adsorption in terms of the volume of nitrogen under standard conditions) is 50 ml/g or greater with a relative vapor pressure change of 0.1 in a relative vapor pressure range of 0.2–0.8 for the nitrogen adsorption isotherm measured at liquid nitrogen temperature. A mesoporous solid satisfying this condition has mesopores of a substantially uniform pore size, and this uniform pore structure of the mesopores notably improves the selectivity for components in gases.

In the porous solid for gas adsorption separation of the invention, at least 60% of the total pore volume excluding the micropores is preferably in a range of ±40% of the median pore size. This condition also indicates that the mesoporous solid has mesopores of a substantially uniform pore size, and a mesopore structure with this degree of homogeneity tends to further improve the selectivity for components in gases.

For example, if the median pore size in the pore size distribution curve is 3.00 nm and at least 60% of the total pore volume excluding the micropores is in a pore size range of ±40% thereof, then the total volume of pores with a pore size in the range of 1.80–4.20 will constitute at least 60% of the total pore volume excluding the micropores (the total volume of pores with a size of no greater than 50 nm as the maximum that can be measured by gas adsorption and at least 2 nm as the minimum for mesopores). Specifically, this means that the value of the integral of the pore volume of pores with a size of 1.80–4.20 nm in the pore size distribution curve is at least 60% of the total value of the integral of the pore volume of pores with a size of 2–50 nm in the pore size distribution curve.

(Pore structure)

The shapes of the pores in the porous solid for gas adsorption separation of the invention may be one-dimensionally extending tunnel shapes, or three-dimensional box shapes or spherical shapes wherein the pores are connected. The pore structure of the porous material of the invention may be a two-dimensional hexagonal structure (p6 mm), a three-dimensional hexagonal structure (P6$_3$/mmc), a cubic structure (Ia3$^-$d, Pm3$^-$n), lamellar, or an irregular structure, but the preferred pore structure is one with mesopores wherein the pores are three-dimensionally connected. With mesopores extending as tunnel shapes, the gas components can enter into the pores more easily and diffuse more rapidly in the pores, thus tending to allow greater efficiency for adsorption separation.

(Framework composition of pore walls)

The porous solid with such mesopores has pore walls of an inorganic-based framework or pore walls of an inorganic/organic hybrid-based framework. That is, the pore walls of the porous solid for gas adsorption separation of the invention have an inorganic-based framework or an inorganic/organic hybrid-based framework.

An inorganic-based framework comprises a polymer main chain of an inorganic oxide such as a silicate. As atoms to replace silicon in a basic silicate framework, or as atoms to be added to the silicate framework, there may be mentioned aluminum, titanium, magnesium, zirconium, tantalum, niobium, molybdenum, cobalt, nickel, gallium, beryllium, yttrium, lanthanum, hafnium, tin, lead, vanadium, boron and the like.

As other inorganic-based frameworks there may be mentioned non-Si-based inorganic oxides such as zirconia, titania, niobium oxide, tantalum oxide, tungsten oxide, tin oxide, hafnium oxide and alumina, or compound oxides wherein these inorganic oxides incorporate atoms into the aforementioned silicate framework as the basic framework.

Various organic groups and the like may be added as side chains on such inorganic basic frameworks. As such side chains there may be mentioned thiol and thiol-containing organic groups, lower alkyl groups such as methyl and ethyl, as well as phenyl, carboxyl, amino, vinyl and the like.

An inorganic/organic-based hybrid framework has an organic group containing one, two or more carbon atoms bonded to the metal atom-containing polymer main chain, either directly from the carbon atoms to the metal atoms of the main chain or via oxygen atoms. The bonding between the organic group and the polymer main chain may occur at one, two or more points. The main chain form is not particularly restricted and may be linear, reticular, branched or any of other various forms.

The metal atom in the main chain is not particularly restricted, and there may be mentioned silicon, aluminum, zirconium, tantalum, niobium, tin, hafnium, magnesium, molybdenum, cobalt, nickel, gallium, beryllium, yttrium, lanthanum, lead, vanadium, titanium and the like. Silicon, titanium, zirconium and aluminum are preferred, and silicon is most preferred among these. According to the invention, any one or combination of two or more different metal atoms may be used.

In the main chain, carbon is included in the form of an organic group of one, two or more carbon atoms. The one or more carbon atoms in the organic group are bonded at one, two or more points on the metal atom of the main chain. The bonding site with the metal atom may be the end of the organic group or any other site other than the end.

There are no particular restrictions on the organic group. It may be any of several hydrocarbon groups, such as alkyl chains, alkenyl chains, vinyl chains, alkynyl chains, cycloalkyl chains, benzene rings or benzene ring-containing hydrocarbons, as well as organic functional groups such as hydroxyl, amino, carboxyl and thiol groups, and organic groups derived from compounds with one or more carbon atoms. The organic group may be one type or two or more types in combination.

As organic groups to bond at two points onto the polymer main chain there are preferred hydrocarbon groups derived from alkyl chains, and more preferably hydrocarbon groups derived from linear alkyl chains of 1–5 carbons. Specifically there may be mentioned alkylene chains such as methylene (—$CH_2CH_2$—). As a preferred organic group there may be mentioned phenylene-group (—$C_6H_4$—).

The atoms of the inorganic/organic hybrid-based main chain may include metal atoms and carbon atoms, as well as other atoms. The "other atoms" are not particularly restricted, but are preferably oxygen atoms positioned between the metal atoms and metal atoms. Specifically there may be mentioned bonds such as Si—O, Al—O, Ti—O, Nb—O, Sn—O and Zr—O. These bonds correspond to bonds between metal atoms and oxygen atoms in polymetalloxanes of transition metals, such as polysiloxanes and polyalloxanes. The bonds may be of one type of combinations of two or more types. Atoms such as nitrogen, sulfur or various halogens may also be included.

In the inorganic/organic hybrid-based main chain structure explained above, the side chain portion bonded to the atom of the main chain may also have an added metal atom, organic functional group or inorganic functional group. Preferred examples are thiol groups, carboxyl groups, lower alkyl groups such as methyl and ethyl, phenyl groups, amino groups, vinyl groups and the like.

(Pore wall structure)

The porous solid for gas adsorption separation of the invention has porous pore walls possessing the framework described above.

That the pore walls are porous means that the pore walls have numerous cavities. These cavities in the pore walls will hereunder be referred to as micropores. The size (mean size) of the micropores is preferably less than 2 nm, more preferably at least 0.2 nm and less than 2.0 nm, and even more preferably at least 0.5 nm and no greater than 1.5 nm. The size of the micropores is also preferably smaller than the median pore size of the mesopores of the porous solid. Thus, the micropores preferably have a size of at least 0.2 nm and less than 2 nm compared to at least 3 nm and less than 30 nm for the median pore size, and more preferably the micropores have a size of at least 0.5 nm and less than 1.5 nm compared to at least 5 nm and less than 30 nm for the median pore size. A porous solid with this structure will tend to exhibit even better adsorption separation properties with the micropores.

The t-plot method may be used to detect the presence of the micropores in the mesoporous solid, and to determine their volume and size distribution. The t-plot is a curve of the adsorption (v) plotted against the mean film thickness (t) of the adsorption film (where the x-axis is the mean film thickness and the y-axis is the adsorption). A t-plot can be derived from the adsorption isotherm of the mesoporous solid (the adsorption plotted against the relative pressure of adsorption gas).

For detection of the presence of micropores, an adsorption isotherm for the mesoporous solid is obtained first. An approximate curve is then drawn from an appropriate standard isotherm to convert the relative pressure ($P/P_0$) into the adsorption layer film thickness (t), and this approximate curve is used to convert the relative pressure into the adsorption layer film thickness, for the adsorption isotherm of the mesoporous solid.

The standard isotherm used here is preferably an isotherm for a material with the same C value as the mesoporous solid, based on the BET equation. Specifically, a nonporous material with a similar composition is used. For example, if the mesoporous solid sample is a silica material, the standard isotherm is one drawn using nonporous silica. The t-plot method is described in M. R. Bhambhani et al., J. Colloid and Interface Sci., 38, 109(1972).

When no micropores are present in the mesoporous solid, the t-plot of the mesoporous solid is a straight line traversing the origin. When micropores are present, however, the straight line of the t-plot does not traverse the origin, and the point of intersection with the vertical axis (y-axis), i.e. the y-intercept, is positive. The value of the y-intercept indicates the volume of the micropores.

The micropore size can be determined by the MP method (R. SH. Mikhail et al., J. Colloid and Interface Sci., 26, 45(1968)).

In this t-plot, the 1st, 2nd, 3rd . . . nth linear slopes are drawn for each t value block from the origin to 4 Å, 4–4.5 Å, 4.5–5 Å . . . An example is shown in FIG. 1. For this linear slope, the average film thickness (t) of the adsorption layer is obtained by the following equation.

$t(Å)=10^4 \times$(adsorption (V)/surface area ($BET$))

The surface area for each linear slope can be determined from this equation. For example, the pore surface area with a thickness in the range of 4–4.5 Å is the difference between the surface area value determined from the first slope and the surface area value determined from the 2nd slope.

The micropore volume V is calculated according to the following equation until the value of the linear slope no longer decreases (until a state with all of the micropores filled is reached).

Micropore volume V (mg/g)=$10^4 \times (S_1-S_2)(t_1+t_2)/2$

Figure 2:
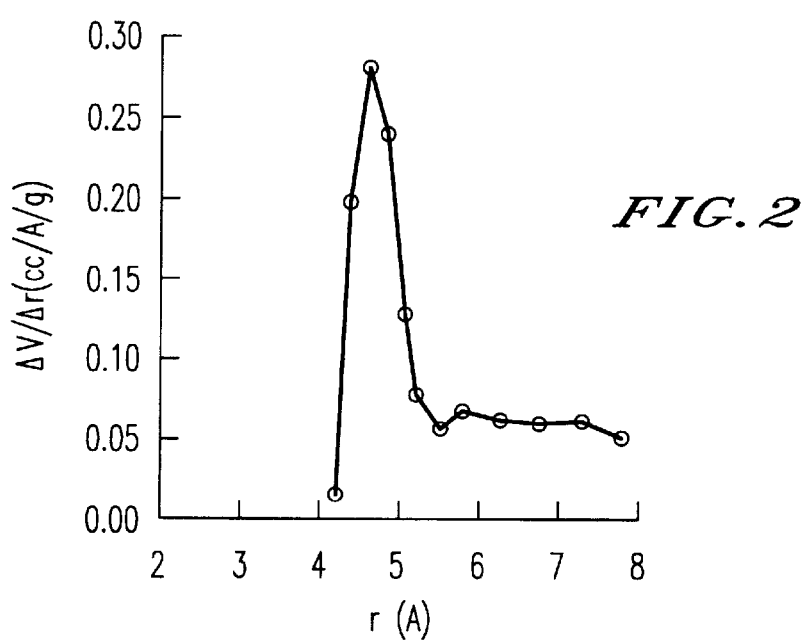
FIG. 2 is a graph showing a distribution curve of micropores drawn based on FIG. 1.

For each t value block, the result of dividing the difference in the pore volume, $\Delta V=V_n-V_{n-1}$, by the difference in the mean pore size r ($=t_n+t_{n-1}$), $\Delta r$ ($=r_n-r_{n-1}$), is plotted against the mean pore size r, to give the micropore distribution. An example is shown in FIG. 2.

In the porous solid for gas adsorption separation of the invention, the micropore volume is preferably 0.05 ml/g or greater, more preferably from 0.05 ml/g to 0.3 ml/g, and even more preferably from 0.1 ml/g to 0.3 ml/g. If the micropore volume satisfies these conditions, the selective adsorption separation performance of the micropores will tend to be improved.

The micropore volume is preferably at least 10% and more preferably from 20% to 50% of the total pore volume. Such a pore volume relationship will facilitate expression of the adsorption separation properties due to the presence of the micropores.

(Thickness of pore walls)

The porous solid for gas adsorption separation of the invention preferably has pore walls with a thickness of at least 2 nm, more preferably at least 3 nm, even more preferably at least 4 nm and most preferably at least 5 nm. This is to ensure the strength, heat resistance and hot water resistance of the pore walls, and also to ensure the micropore volume. A certain degree of strength and micropore volume will tend to more satisfactorily exhibit the adsorption separation properties of the micropores. The pore wall thickness can be determined by subtracting the median pore size from the lattice constant $a_0$ ($a_0=d_{100} \times 2/1.732$) determined by X-ray diffraction.

The porous solid for gas adsorption separation of the invention may be in the form of a powder, granules, support film, self-supporting film, transparent film, oriented film, spheres, fibers, or clear particles of micrometer size burned onto a substrate. The preferred form is a powder.

(Porous solid production method)

The porous solid for gas adsorption separation according to the invention is preferably obtained by the following production method.

Specifically, the porous solid for gas adsorption separation of the invention is basically obtained by condensation polymerization of the framework component of the mesoporous solid using a surfactant as the template to obtain a porous structure, and then removing the surfactant.

(Framework component)

Alkoxysilanes, sodium silicate or silica may be used as inorganic-based framework components to form the inorganic-based polymer main chain by condensation polymerization. As alkoxysilanes there may be used tetramethoxysilane, tetraethoxysilane and tetrapropoxysilane. These framework components form silicate frameworks.

There may also be used alkylalkoxysilanes with lower alkyl groups, such as methyltrimethoxysilane and ethyltrimethoxysilane, as well as alkoxysilanes with other organic groups and functional groups. Phenyl-group may be mentioned as an organic group. Amino, carboxyl and thiol groups may be mentioned as functional groups. Alkoxysilanes containing such organic groups or functional groups may be used to introduce those organic groups or functional groups into the basic silicate framework. Any of these alkoxysilanes, etc. may be used alone or in combinations of two or more.

Compounds or inorganic-based framework components containing other elements may also be used instead of sodium silicate, silica or alkoxysilanes. For example, pseudo-boehmite, sodium aluminate, aluminum sulfate or a dialkoxyaluminotrialkoxysilane can be added as an Al source to synthesize a mesoporous solid with a basic framework composed of $SiO_2$—$Al_2O_3$. Alternatively, an oxide compound with Si replaced with a metal such as Ti, Zr, Ta, Nb, Sn or Hf may be used. This can yield a metallosilicate-based mesoporous solid ($SiO_2$—$MO_{n/2}$) with various metals ($M^{n+}$, where n is the charge of the metal) included in a silicate framework. For example, addition of a titanate compound such as $Ti(OC_2H_5)_4$, vanadyl sulfate ($VOSO_4$), boric acid ($H_3BO_3$) or manganese chloride ($MnCl_2$) to an alkoxysilane co-condensation reaction can yield a metallosilicate-based mesoporous solid with Ti, V, B or Mn introduced therein, respectively.

Any of the organometallic compounds listed below may be used as the inorganic/organic hybrid-based framework component forming the inorganic/organic hybrid-based framework by condensation polymerization. The organic group in the organometallic compound may be an organic group introduced into the basic framework of the mesoporous solid. This metal compound is an organometallic compound having an organic group bonded to two or more metal atoms, and having one or more alkoxyl groups or halogen groups with each of the two or more metal atoms bonded to the organic group. That is, the organic group in the organometallic compound has one, two or more carbon atoms, and the carbon atoms are bonded to two or more metal atoms.

There are no particular restrictions on the metal atoms, and there may be mentioned silicon, aluminum, zirconium, tantalum, niobium, tin, hafnium, magnesium, molybdenum, cobalt, nickel, gallium, beryllium, yttrium, lanthanum, lead, vanadium, and the like. The organometallic compounds used for the invention may have one of these metal atoms, or a combination of two or more thereof.

The organic group in the organometallic compound has one, two or more carbon atoms and two or more bonding sites with the metal atoms among these carbon atoms. One of the carbon atoms in the organic group may have two or more bonding sites with the metal atoms, or two or more different carbon atoms will sometimes have separate bonding sites with the metal atoms.

The organic group is not particularly restricted other than being bonded to two or more metal atoms. It may be any of several hydrocarbon groups, such as alkyl chains, alkenyl chains, vinyl chains, alkynyl chains, cycloalkyl chains, benzene rings or benzene ring-containing hydrocarbons, as well as organic functional groups such as hydroxyl, carboxyl and thiol groups, and organic groups derived from compounds with one, two or more carbon atoms. Specifically there may be mentioned alkylene chains such as methylene (—$CH_2CH_2$—), and phenylene (—$C_6H_4$—).

The organometallic compound of the invention has one or more alkoxyl groups or halogens on each metal atom to which the organic group is bonded. The hydrocarbon group in the alkoxyl group is a linear, cyclic or alicyclic hydrocarbon group. It is preferably an alkyl group, and more preferably a linear alkyl group of 1–5 carbons. As halogens there may be used any of the common halogens such as chlorine, bromine, fluorine or iodine. One or more alkoxyl groups or halogens may be present on each metal atom to which the organic group is bonded, and other alkoxyl groups or halogens may also be present.

As such organometallic compounds there may be mentioned, specifically, organometallic compounds with metallic alkoxy groups or metallic halogen groups on both ends of the organic groups. An example is $(CH_3O)_3Si$—$CH_2$—$CH_2$—$Si(OCH_3)_3$. There may also be used $(CH_3O)_3Si$—$C_6H_4$—$Si(OCH_3)_3$, wherein the —$CH_2$—$CH_2$— portion is replaced with another organic group such as —$C_6H_4$—. Compounds wherein Si is replaced with another metal such as Al, Ti, Zr, Ta, Nb, Sn or Hf may also be used. A compound wherein the methoxyl group is replaced with a halogen may also be used. The alkoxyl group or halogen is a hydrolyzable group in the condensation polymerization reaction.

The organometallic compound may also include other atoms or organic or inorganic functional groups in addition to the metal atom and organic group. There are no particular restrictions on other atoms or functional groups, and atoms such as nitrogen, sulfur or halogens, or functional groups containing these atoms, may be included.

Thus, a combination of various of the aforementioned organic groups and metal atoms may be obtained as the organometallic compound. The organometallic compound may be used as a single type or a combination of two or more types. The organometallic compound may also be used alone as the framework component, or the organometallic compound may be used as the framework component together with another framework component such as an alkoxysilane.

(Template)

A non-ionic surfactant may be used as the surfactant to serve as the template. There are no particular restrictions so long as it is a non-ionic surfactant, and for example, there may be used a polyethylene oxide-based non-ionic surfactant having a hydrocarbon chain as the hydrophobic portion and polyethylene oxide as the hydrophilic portion. As such surfactants there may be mentioned $C_{16}H_{33}(OCH_2CH_2)OH$ (This structure will hereunder be abbreviated to $C_{16}EO_2$.), $C_{12}EO_4$, $C_{16}EO_{10}$, $C_{16}EO_{20}$, $C_{18}EO_{10}$, $C_{16}EO_{20}$, $C_{18}H_{35}EO_{10}$, $C_{12}EO_{23}$ and $C_{16}EO_{10}$.

The hydrophobic portion may be any of various sorbitan fatty acids esters with fatty acids such as oleic acid, lauric acid, stearic acid, palmitic acid and the like. Specific ones include $CH_3C(CH_3)CH_2C(CH_3)_2C_6H_4(OCH_2CH_2)_xOH$ (where x is an average of 10), TritonX-100 (Aldrich), polyethyleneoxide (20) sorbitan monolaurylate (Tween20, Aldrich), polyethyleneoxide (20) sorbitan monopalmitate (Tween40), polyethyleneoxide (20) sorbitan monostearate, polyethyleneoxide (20) sorbitan monooleate (Tween 60) and sorbitan monopalmitate (Span 40). One type of polyethylene oxide-based non-ionic surfactant may be used, or two or more types may be used in combination.

Triblock copolymers with three polyalkylene oxide chains may also be used. Particularly preferred is the use of a polyethylene oxide chain-polypropylene oxide chain-polyethylene oxide chain triblock copolymer. This surfactant has a structure with a polypropylene oxide chain in the center and polyethylene oxide chains at both ends, and hydroxyl groups at both ends. The basic structure of this triblock copolymer is represented as $(EO)_x(PO)_y(EO)_x$. There are no particular restrictions on x and y. For example, the triblock copolymer may have a structure with the following ranges: x=5–110, y=15–70. A triblock copolymer with x=15–20, y=50–60 is preferred. Preferred triblock copolymers have the formula $(EO)_x(PO)_y(EO)_x$ obtained with a combination of any x value selected from 15, 16, 18, 19 and 20, with a y value which is an integer included in y=50–60.

There may likewise be used a polypropylene oxide chain-polyethylene oxide chain-polypropylene oxide chain triblock copolymer, with the reverse sequence of blocks $((PO)_x(EO)_y(PO)_x)$. There are also no particular restrictions on x and y in this copolymer, but the following ranges: x=5–110, y=15–70 are preferred, and a triblock copolymer wherein x=15–20 and y=50–60 is more preferred.

Specific triblock copolymers that may be used include $EO_5PO_{70}EO_5$, $EO_{13}PO_{30}EO_{13}$, $EO_{20}PO_{30}EO_{20}$, $EO_{26}PO_{39}EO_{26}$, $EO_{17}PO_{56}EO_{17}$, $EO_{17}PO_{58}EO_{17}$, $EO_{20}PO_{70}EO_{20}$, $EO_{80}PO_{30}EO_{80}$, $EO_{106}PO_{70}EO_{106}$, $EO_{100}PO_{39}EO_{100}$, $EO_{19}PO_{33}EO_{19}$ and $EO_{26}PO_{39}EO_{26}$, with $EO_{17}PO_{56}EO_{17}$ and $EO_{17}PO_{58}EO_{17}$ being preferred. These triblock copolymers are industrially available from BASF Corp. and elsewhere, and triblock copolymers with desired x and y values are obtainable on a small-scale production level. One type of triblock copolymer may be used, or two or more types may be used in combination.

There may also be used a star diblock copolymer having two polyethylene oxide chain-polypropylene oxide chain segments linked to each of the two nitrogen atoms in ethylenediamine. As examples there may be mentioned $(EO_{113}PO_{22})_2NCH_2CH_2N(PO_{22}EO_{113})_2$, $(EO_3PO_{18})_2NCH_2CH_2N(PO_{18}EO_3)_2$ and $(PO_{19}EO_{16})_2NCH_2CH_2N(EO_{16}PO_{19})_2$. One type of star diblock copolymer may be used, or two or more types may be used in combination.

A primary alkylamine or the like may also be used as the non-ionic surfactant. The resulting pore size can be controlled by the type of surfactant used, and particularly by the length of the hydrophobic portion, such as an alkyl chain, in the surfactant.

(Condensation polymerization)

A porous solid for gas adsorption separation is then obtained from the reaction system (liquid) containing the framework component and the surfactant. The solvent used for the condensation polymerization reaction may be water, an organic solvent, a mixture of water and an organic solvent, etc., but water is preferred.

The reaction system for the condensation polymerization reaction is not limited to being alkali, neutral or acidic, but it is preferably acidic. Specifically, the pH is preferably no higher than 1. For example, hydrochloric acid, boric acid, hydrobromic acid, hydrofluoric acid, hydroiodic acid, nitric acid, sulfuric acid, phosphoric acid or the like may be used. According to the invention, the acid may be of one type or a combination of two or more. The acid used for the invention is preferably hydrochloric acid or sulfuric acid. It is particularly preferred to use hydrochloric acid to adjust the pH to no higher than 0.5.

The surfactant is preferably used at low concentration to obtain a porous solid according to the invention. It is preferably in a range of less than 29.67 g/l with respect to the total volume of the solvent used in the reaction system. This is because micropores will not form if the concentration is 29.67 g/l or higher. It is also preferably at least 7 g/l, because micelle formation is inhibited if it is less than 7 g/l. The upper limit for the concentration is preferably 29 g/l, more preferably 25 g/l and even more preferably 20 g/l. The lower limit is preferably 10 g/l and preferably 12 g/l. The most preferred concentration is approximately 15 g/l.

The framework component is preferably present at 0.012 mole or greater with respect to 1 g of the surfactant.

There are no particular restrictions on the method of mixing the reaction system components, but it is preferred to mix the surfactant with the solvent and simultaneously or subsequently add the acid for the preferred acidic environment, and then add the framework component. The temperature of the mixture system to which the surfactant, acid, etc. are added, and the duration of the addition, may be sufficient to give a solution which uniformly dissolves the surfactant and is otherwise not restricted, but a temperature of 0° C. to 100° C. is preferred.

The condensation polymerization reaction will start so long as the surfactant and framework component are in a state allowing condensation polymerization, such as in the presence of an acidic environment. The framework component may be added at once, or gradually added while stirring. The temperature for addition of the framework component is not particularly restricted, but is preferably from 35° C. to 80° C., and more preferably from 40° C. to 45° C. There are also no particular restrictions on the duration of the addition, but it is preferably one minute or longer.

The molar ratio of each constituent component, i.e. the molar ratio for the framework component:surfactant:hydrochloric acid:solvent in the reaction system, is preferably 0.042–0.175:0.00073–0.0030:1:27.79. In this case, the solvent is preferably water. The molar ratio for the framework component:surfactant (framework component/surfactant) is preferably 60 or greater, more preferably 90 or greater and even more preferably 120 or greater. An increasing molar ratio will give a smaller pore size and thicker pore walls. It will also allow a smaller pore volume.

A greater molar ratio (thicker pore walls) can also increase the micropore volume. Increasing the molar ratio reduces the pore volume to increase the micropore volume, thereby increasing the ratio (%) of the micropore volume with respect to the pore volume.

A large molar ratio is achieved by reducing the amount of surfactant used and/or increasing the amount of framework component used. If the surfactant is limited to a fixed concentration, and specifically less than 29.67 g/l or more preferably no greater than 15 g/l, using a greater amount of framework component can provide the effect of successfully increasing the micropore size. The framework component is preferably used in an amount of at least 0.012 mole with respect to 1 g of the surfactant.

The condensation polymerization reaction temperature will differ depending on the type and concentration of the surfactant and framework component used, but the reaction will usually be conducted in a temperature range from 0° C. to 100° C., and more preferably from 35° C. to 80° C. When a triblock copolymer is used as the surfactant, this range is preferably from 40° C. to 45° C. A lower temperature will tend to give higher regularity to the structure of the product. A lower temperature will also tend to give a smaller pore size and thicker pore walls.

The duration of the condensation polymerization will differ depending on the constituent components in the reaction system, but will generally be from 8 hours to 24 hours. The reaction may be carried out in a static state, an agitated state, or a combination of agitated and static states. The temperature conditions may also be changed depending on the reaction state.

The pore size of the porous solid of the invention may be controlled by adding a hydrophobic compound such as trimethylbenzene or triisopropylbenzene to the surfactant.

(Hot water treatment)

If necessary, hot water treatment is carried out after the condensation polymerization reaction. Specifically, the following hot water treatment may be carried out before the treatment to remove the surfactant from the porous solid precursor (that is, the product with the surfactant filling the pores).

The porous solid precursor is dispersed in an aqueous solution containing the same surfactant used for the condensation polymerization reaction (typically with a surfactant concentration equal to or lower than that of the condensation polymerization reaction), and the precursor is subjected to hot water treatment in a temperature range from 50° C. to 200° C. More specifically, the reaction solution is heated either directly or after dilution. The heating temperature is preferably from 60° C. to 100° C., and more preferably from 70° C. to 80° C. Here, the pH may be slightly alkaline, and is preferably from 8 to 8.5. It may be appropriately adjusted with hydrochloric acid or sodium hydroxide. The treatment time is not particularly restricted, but is preferably at least an hour, and more preferably from 3 to 8 hours. It may be continued for even a longer time, but no notable difference in effect will be seen even if the treatment time is extended for a longer time. The hot water solution is preferably agitated during the treatment. After the hot water treatment, the precursor is filtered and dried, and the excess treatment solution is eliminated. Agitation treatment may also be carried out at room temperature after dispersion of the precursor in the aforementioned aqueous solution and before the hot water treatment. This can increase the effect of the hot water treatment.

As a result of this hot water treatment, it is possible to enhance the strength and structural regularity of the porous solid after removal of the surfactant. It is thereby possible to provide a mesoporous solid with more excellent pore stability and structural regularity, i.e. uniform pore distribution, than a porous solid that has not undergone such hot water treatment. For example, if a porous solid precursor with a hexagonal structure is subjected to such hot water treatment, the pore size of the mesoporous solid (the final product) can be easily rendered uniform to an extent wherein at least 60% of the total pore volume is in a range of ±40% of the pore size exhibiting the maximum peak in the pore size distribution curve.

(Surfactant removal)

After the condensation polymerization reaction, or after the hot water treatment, the produced precipitate or gel is filtered, and if necessary is washed with water and then dried to yield a solid product. The surfactant is then removed from the solid product. The removal of the surfactant from the solidified product may be accomplished by a firing method or by a method of treatment with a solvent such as water or alcohol.

A firing method involves heating in a range from 300° C. to 1000° C., and preferably in a range from 400° C. to 700° C. The heating time may be 30 minutes or longer, but is preferably at least an hour to completely remove the organic components. The atmosphere may be an air stream, and because of the large volume of firing gas that is generated, it may be a stream of an inert gas such as nitrogen at the start of firing.

A method of treatment with a solvent or the like involves dispersion of the solid product in a solvent with a high solubility for the surfactant, followed by agitation and then recovery of the solid. The solvent used is one with a high solubility for the surfactant, such as water, ethanol, methanol or acetone. Treatment with water is preferably carried out in a range from 25° C. to 80° C. A small amount of a cationic component may also be added for adequate solubility. Cationic component-containing substances that may be added include hydrochloric acid, acetic acid, sodium chloride, potassium chloride and the like. The cation addition concentration is preferably 0.1–10 moles/l. The solid product is preferably dispersed in an ethanol solvent with the solid product at 0.5 to 50 g with respect to 100 cc of the ethanol solvent. The dispersion is preferably agitated in a temperature range from 25° C. to 100° C. In the case of a non-ionic surfactant, extraction will sometimes be carried out with the solvent alone. The extraction of the surfactant will sometimes be facilitated by using water or hydrochloric acid-added water as the solvent. Pulverization, sifting, shaping, etc. may be carried out either before or after removal of the surfactant.

As a preferred condensation polymerization method, a lower tetraalkoxysilane of 1–5 carbons such as tetramethoxysilane or tetraethoxysilane, or $(CH_3O)_3Si\text{—}CH_2\text{—}CH_2\text{—}Si(OCH_3)_3$, $(CH_3O)_3Si\text{—}C_6H_4\text{—}Si(OCH_3)_3$ or the like is used as the framework component, a triblock copolymer represented as $(EO)_x(PO)_y(EO)_x$ (where $x=5$–110, $y=15$–70, and preferably $x=15$–20, $y=50$–60) is used at a concentration of no greater than 29.67 g/l and preferably no greater than 15 g/l as the surfactant and water is used as the solvent, and the condensation polymerization is conducted under hydrochloric acid acidity.

This type of reaction system can consistently yield a porous solid having an X-ray diffraction pattern with at least one peak at a diffraction angle corresponding to a d value of 1 nm or greater and having at least one section wherein the change in nitrogen adsorption (nitrogen adsorption in terms of the volume of nitrogen under standard conditions) is 50 ml/g or greater with a relative vapor pressure change of 0.1 in a relative vapor pressure range of 0.2–0.8 for a nitrogen adsorption isotherm measured at liquid nitrogen temperature, which porous solid possesses mesopores with a median pore size of 2–50 nm in the pore size distribution curve and has pore walls that are porous.

[Gas Adsorption Separation Process of the Invention]

The gas adsorption separation process of the invention will now be explained.

The gas adsorption separation process of the invention involves using the porous solid for gas adsorption separation of the invention for contact of gas with the porous solid, whereby specific components in the gas are adsorbed onto the porous solid and then separated based on their subsequent retention times. There are no particular restrictions on the method of contacting the gas with the porous solid, and for example, a gas chromatography method may be employed wherein the porous solid is packed into a column and vapor containing the gas components to be treated is continuously or intermittently contacted therewith. When the specific components in the gas are separated by mere adsorption onto the porous solid, the porous solid and the vapor containing the gas components to be treated may be contacted in a batch system.

As gas components for targets of treatment there may be mentioned hydrocarbons (for example, methane, ethane, ethylene, propane, propylene, n-butane, i-butane, hexane, octane, benzene, cyclohexane, toluene), $CO_2$, CO, $NO_x$, HC, $SO_x$, $H_2S$, methanol, ethanol, etc. in exhaust gas, plant gas, reformed gas and air, and preferably at least one gas component selected from the group consisting of $CO_2$ and hydrocarbons. The conditions for contacting the gas with the porous solid of the invention are not particularly restricted, and the temperature range may be appropriately selected to allow efficient adsorption separation depending on the combination of the porous solid used and the gas components to be treated.

EXAMPLES

The present invention will now be explained in greater detail by way of examples and comparative examples, with the understanding that the invention is in no way restricted by these examples.

Example 1

A triblock copolymer represented by the compositional formula $(EO)_{17}(PO)_{58}(EO)_{17}$ (hereunder referred to as P104. Product of BASF Corp.) was used as a non-ionic surfactant, and tetraethyl silicate (TEOS) was used as the framework component. The TEOS was hydrolyzed using hydrochloric acid as the catalyst in the presence of the P104, for condensation polymerization.

Specifically, after dissolving 1.76 g (0.00035 mole) of P104 in 105 ml of ion-exchange water, 20 ml (0.24 mole) of 12 N hydrochloric acid was added to the surfactant solution (total water: 6.67 moles, surfactant concentration: 14.67 g/l). After then adding 4.73 g (0.021 mole) of TEOS at once to this mixture in a water bath at 45° C., it was agitated for 8 hours. It was then stationed for 8 hours in a hot water bath at 80° C. The white precipitate produced was collected by reduced pressure filtration and thoroughly washed with an abundant amount of ion-exchange water, and then allowed to stand overnight in a dryer at 45° C. The surfactant was removed by raising the temperature from room temperature to 550° C. over a period of 2 hours under an air stream (flow rate: 0.5 ml/min), and firing at 550° C. for 6 hours. This yielded a porous solid (powder) as Sample 1.

Figure 3:
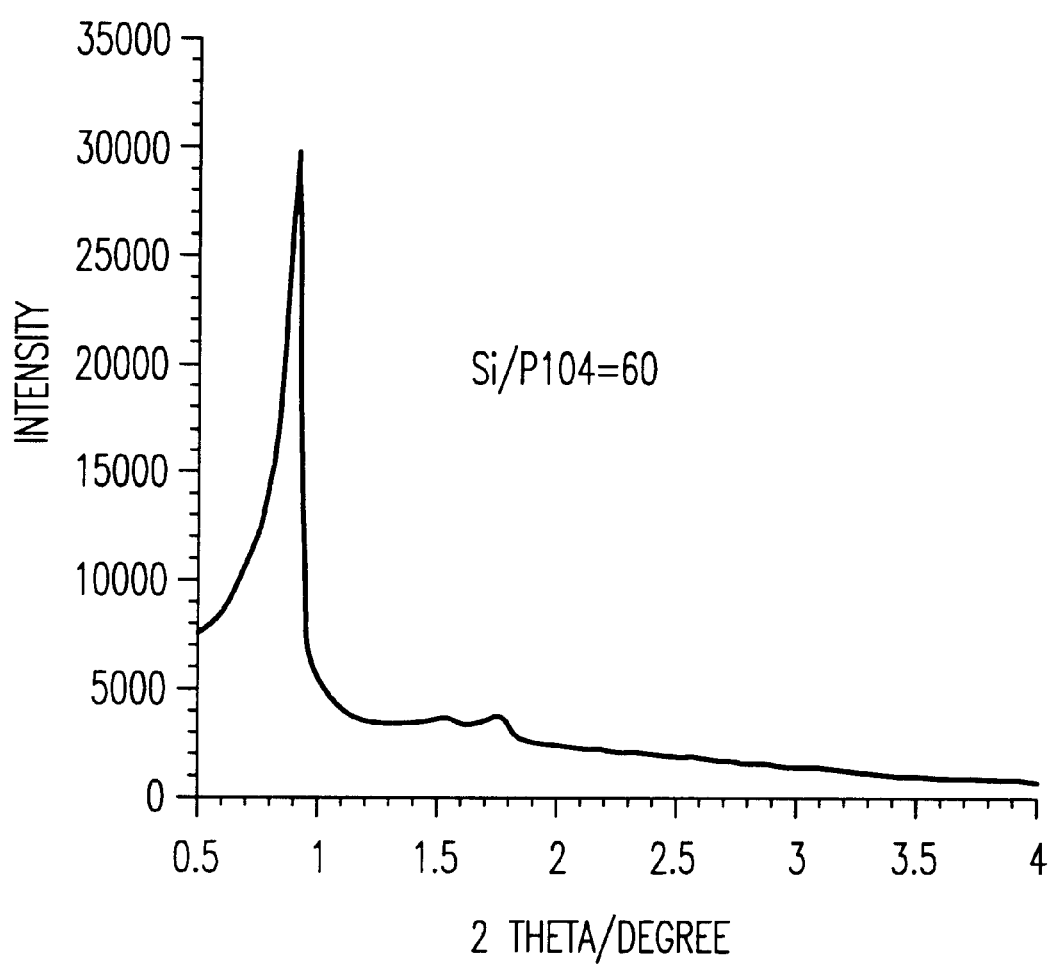
FIG. 3 is a graph showing an XRD pattern for Sample 1.

The XRD pattern of Sample 1 in the low-angle region was measured, giving the results shown in FIG. 3. Sample 1 exhibited a strong peak at d=1.96 and a weak peak at the high-angle end. The diffraction pattern corresponded to the (100), (110) and (120) diffraction planes from the low-angle end, thus confirming that Sample 1 has a hexagonal structure.

Figure 4A:
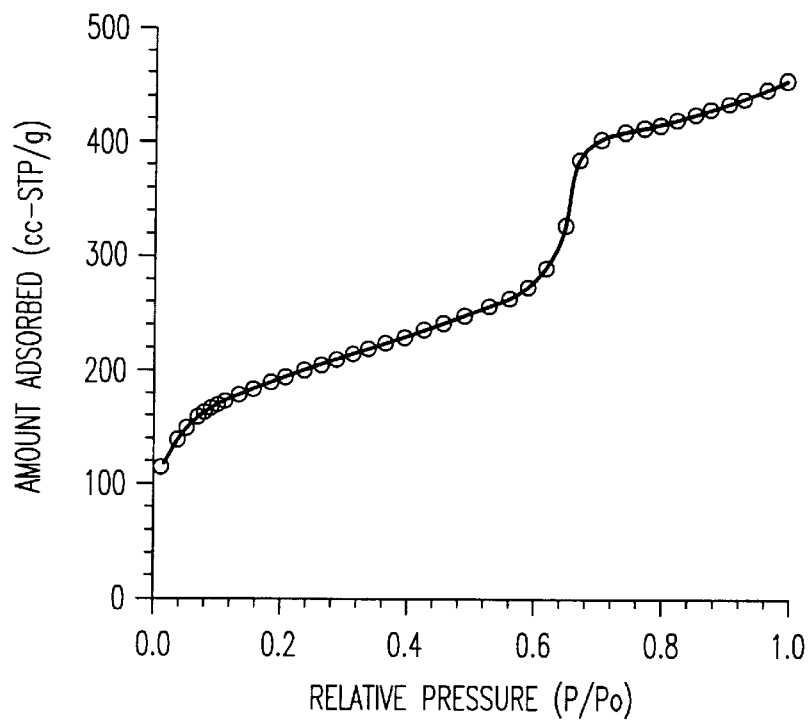
FIG. 4A is a graph showing a nitrogen adsorption isotherm.
Figure 4B:
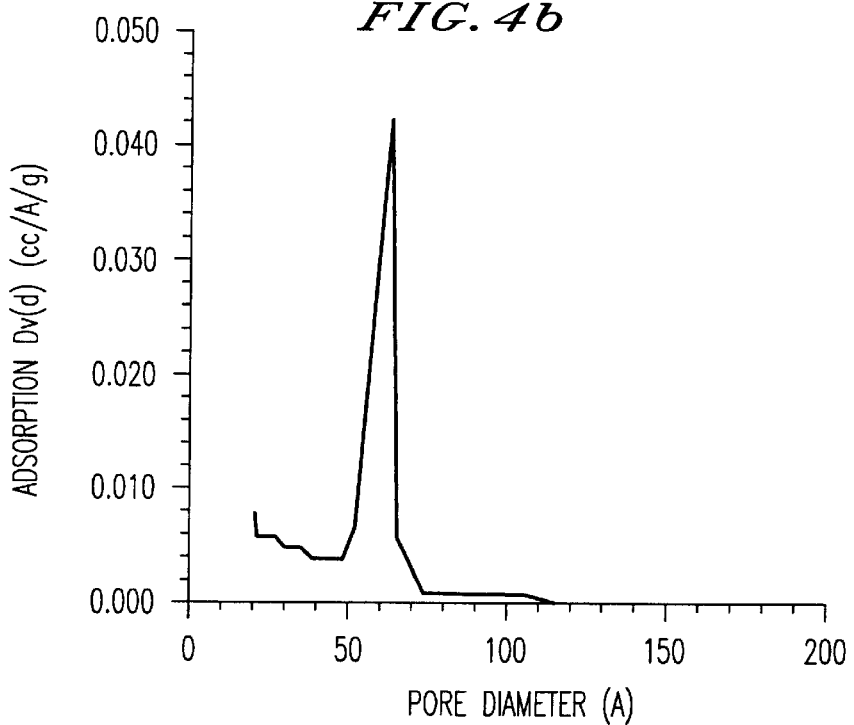
FIG. 4B is a graph showing a pore size distribution curve determined by BJH.
Figure 6A:
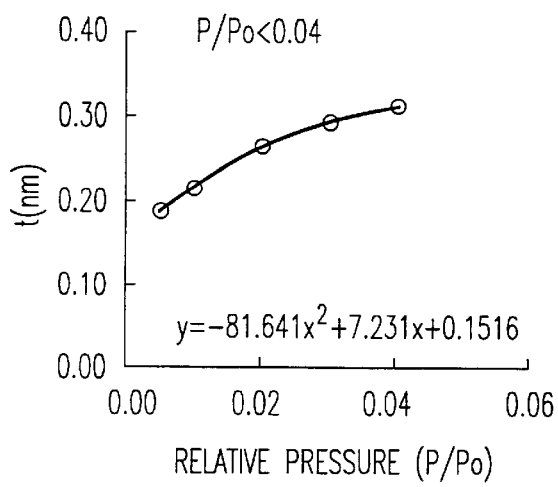
FIGS. 6A to 6D are graphs showing approximate curves obtained based on the respective standard isotherms.
Figure 6B:
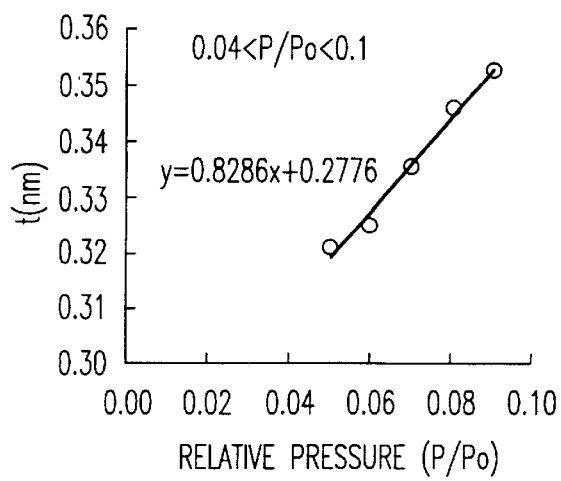
Figure 6C:
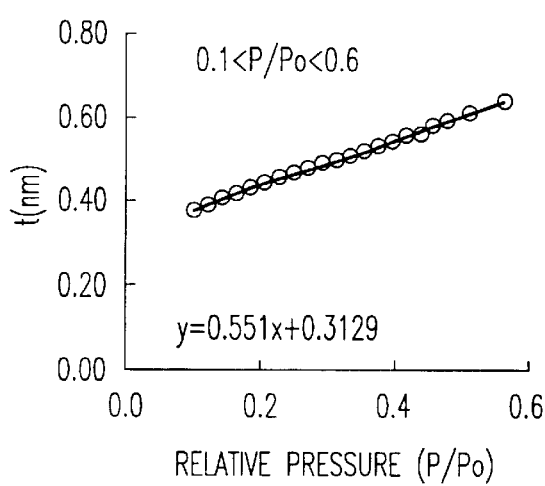
Figure 6D:
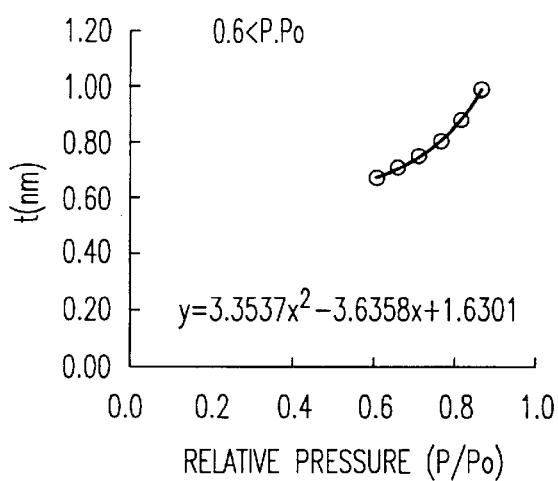

The nitrogen adsorption isotherm and pore distribution curve (BJH method) for Sample 1 were determined, giving the results shown in FIGS. 4A and 4B. The mesopore median pore size, area to weight ratio and total pore volume (with relative pressure $P/P_0=0.98$) for Sample 1 were determined from the pore distribution curve, and the pore wall thickness was determined from the difference between the lattice constant $a_0$ ($a_0=d_{100}\times 2/1.732$) determined by powder X-ray diffraction and the pore size determined by nitrogen adsorption measurement. The results are shown in Table 1.

Also, the nitrogen adsorption isotherm for Sample 1 was t-plotted using the nitrogen adsorption isotherm for nonporous silica with an area to weight ratio of 38.7 $m^2/g$ as the standard isotherm, to calculate the micropore volume. The data for the standard isotherm are shown in FIG. 5, and the approximate curves applying to each relative pressure range with t-plot conversion are shown in FIGS. 6A to 6D.

Figure 7:
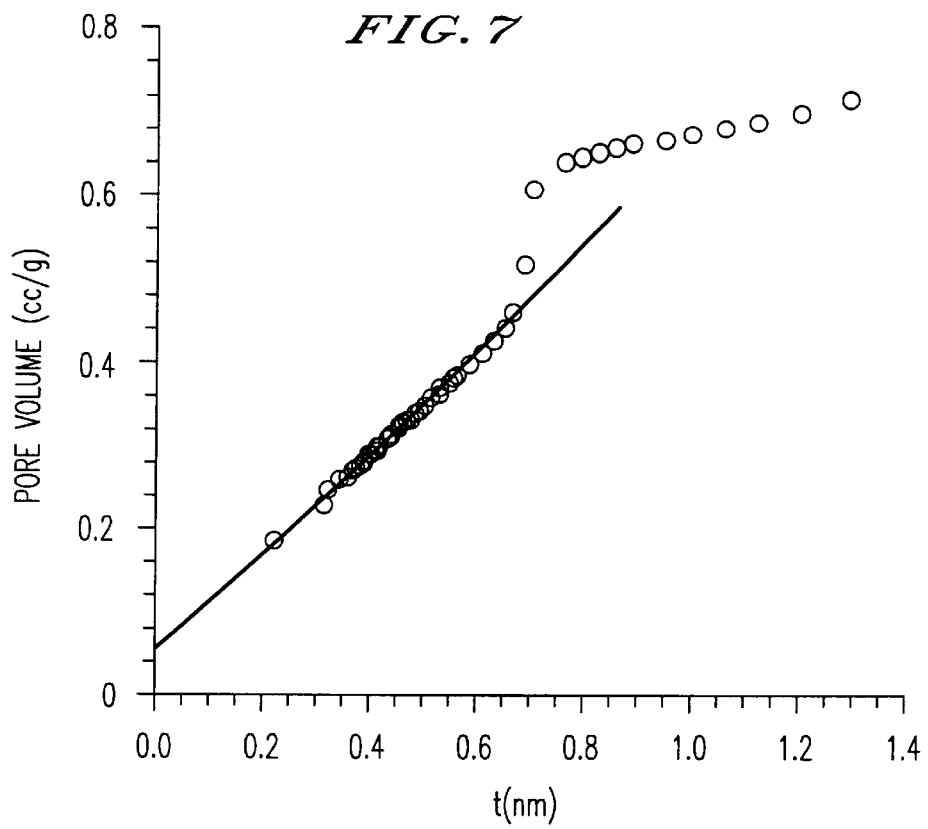
FIG. 7 is a t-plot graph of a nitrogen adsorption isotherm for Sample 1.

These approximate curves were used for a t-plot of the nitrogen adsorption isotherm for Sample 1, giving the graph shown in FIG. 7. Sample 1 was shown to possess micropores, with a total micropore volume of 0.072 ml/g.

This t-plot was used to derive a micropore distribution curve by the MP method, and the micropore size (mean size) obtained from this distribution curve is shown in Table 1.

These analytical data were used to determine the volume ratio of micropores with respect to the pores, the total pore volume, the total pore volume excluding the micropores, the pore volume in a range of ±40% of the median pore size (mesopore volume) and the mesopore volume with respect to the total pore volume excluding the micropores, and the results are shown in Tables 1 and 2. The nitrogen adsorption isotherm shown in FIG. 4A was used to determine the maximum value for the change in nitrogen adsorption (nitrogen adsorption in terms of the volume of nitrogen under standard conditions) with a relative vapor pressure change of 0.1 in a relative vapor pressure range of 0.2–0.8, and the results are shown in Table 3.

Examples 2–4

Figure 8:
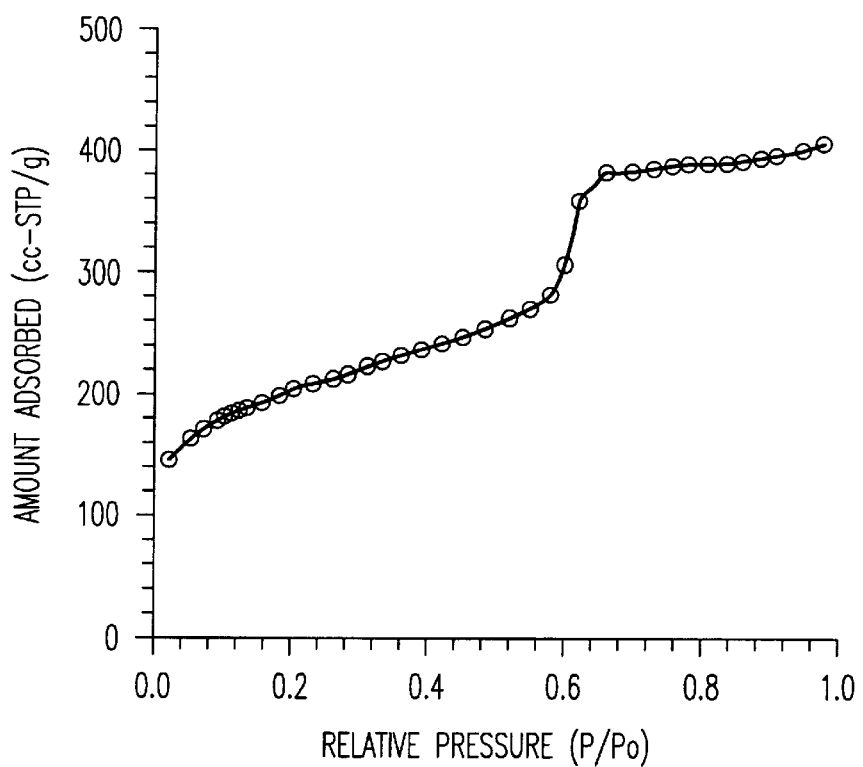
FIG. 8 is a graph of a nitrogen adsorption isotherm for Sample 2.
Figure 9:
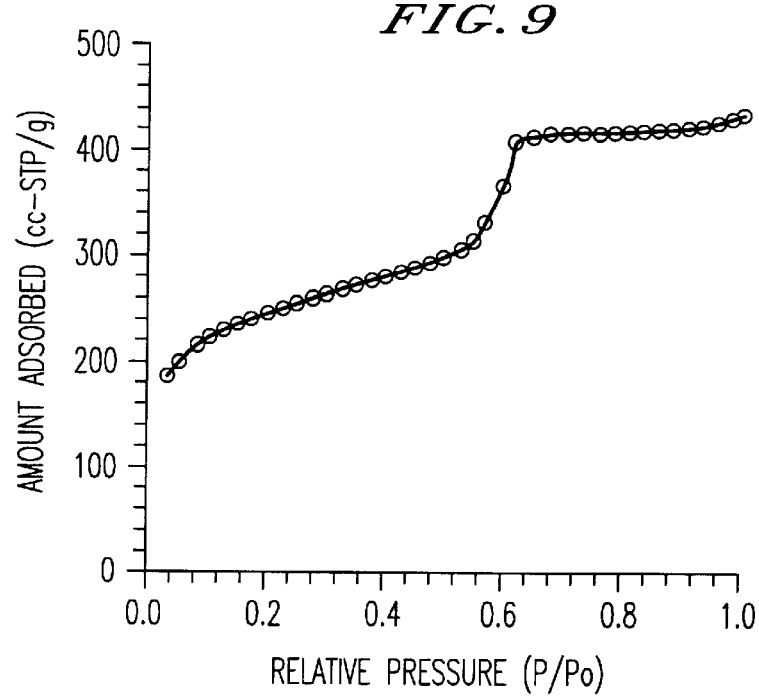
FIG. 9 is a graph of a nitrogen adsorption isotherm for Sample 3.
Figure 10:
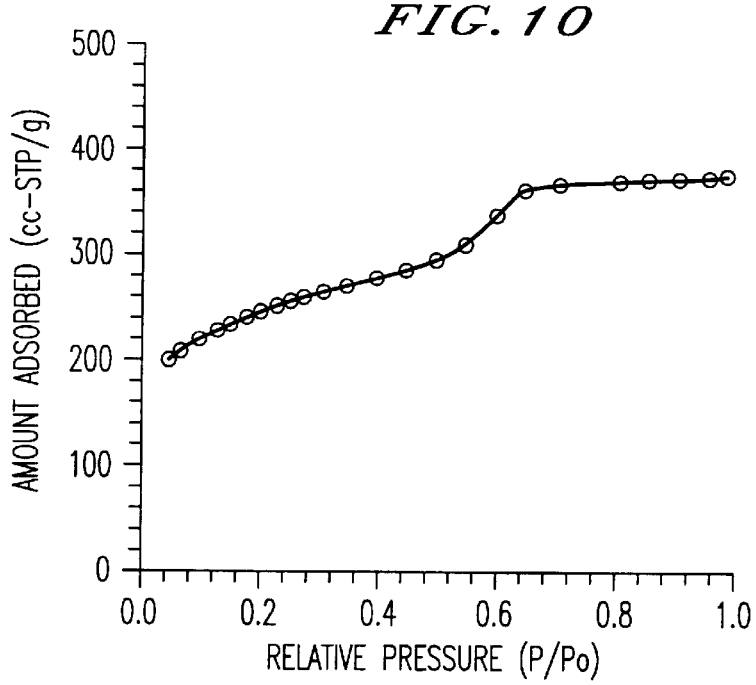
FIG. 10 is a graph of a nitrogen adsorption isotherm for Sample 4.

Porous solids (powders) for Samples 2, 3 and 4 were obtained in the same manner as Example 1, except that TEOS was used in an amount of 6.56 g (0.0315 mole, Example 2), 8.75 g (0.042 mole, Example 3) and 11.04 g (0.053 mole, Example 4). The nitrogen adsorption isotherms determined for Samples 2, 3 and 4 are shown in FIGS. 8 to 10, respectively. The analytical data for Samples 2, 3 and 4 were obtained as in Example 1, and the results are shown in Tables 1 to 3.

Examples 5–6

Porous solids (powders) for Samples 5 and 6 were obtained in the same manner as Example 1, except that the stationed temperatures of the mixture after agitating at 45° C. for 8 hours were 90° C. (Example 5) and 100° C. (Example 6), and the TEOS/P104 was 120. The analytical data for Samples 5 and 6 were obtained according to the procedure as shown in Example 1, and the results are shown in Tables 1 to 3.

TABLE 1

|  | Surfactant concentration (g/l) | Molar ratio (framework component/ P104) | Synthesis temperature (° C.) | Mesopores | | | | Micropores | | Ratio (%) of micropore volume with respect to mesopores |
|---|---|---|---|---|---|---|---|---|---|---|
|  |  |  |  | BET ($m^2/g$) | Size (nm) | Volume * (ml/g) | Pore wall thickness (nm) | Size (nm) | Volume (ml/g) |  |
| Sample 1 | 14.67 | 60 | 80 | 886.2 | 5.75 | 0.392 | 4.14 | <1.0 | 0.072 | 18.38 |
| Sample 2 | 14.67 | 90 | 80 | 723.1 | 5.39 | 0.374 | 5.34 | <1.0 | 0.096 | 25.67 |
| Sample 3 | 14.67 | 120 | 80 | 873.6 | 4.65 | 0.333 | 6.18 | <1.0 | 0.154 | 46.25 |
| Sample 4 | 14.67 | 150 | 80 | 810.7 | 4.86 | 0.250 | 6.46 | <1.0 | 0.192 | 76.80 |

TABLE 1-continued

| | Surfactant concentration (g/l) | Molar ratio (framework component/ P104) | Synthesis temperature (° C.) | BET ($m^2$/g) | Mesopores | | Pore wall thickness (nm) | Micropores | | Ratio (%) of micropore volume with respect to mesopores |
|---|---|---|---|---|---|---|---|---|---|---|
| | | | | | Size (nm) | Volume * (ml/g) | | Size (nm) | Volume (ml/g) | |
| Comparsion sample 1 | 29.67 | 60 | 80 | 850.0 | 8.90 | — | 3.10 | n.d. | n.d. | n.d. |
| Sample 5 | 14.67 | 120 | 90 | 734.1 | 5.01 | 0.553 | 4.98 | <1.0 | 0.127 | 18.68 |
| Sample 6 | 14.67 | 120 | 100 | 618.5 | 5.76 | 0.560 | 4.64 | <1.0 | 0.080 | 12.50 |
| Comparsion sample 2 | 14.67 | 60 | 100 | 646.0 | 6.42 | 0.580 | 3.98 | n.d. | n.d. | n.d. |

* Volume within ±40% of median pore size.

TABLE 2

| | Total pore volume excluding micropores (ml/g) | Mesopore volume* (ml/g) | Ratio (%) of mesopore volume with respect to total pore volume excluding micropores | Total pore volume (ml/g) |
|---|---|---|---|---|
| Sample 1 | 0.511 | 0.392 | 76.71 | 0.638 |
| Sample 2 | 0.418 | 0.374 | 89.47 | 0.514 |
| Sample 3 | 0.355 | 0.333 | 93.80 | 0.509 |
| Sample 4 | 0.261 | 0.250 | 95.79 | 0.453 |
| Sample 5 | 0.553 | 0.450 | 81.37 | 0.680 |
| Sample 6 | 0.560 | 0.430 | 76.79 | 0.640 |

*Volume within ±40% of median pore size.

TABLE 3

| | Maximum value for change in nitrogen adsorption*[2] with relative vapor pressure change*[1] of 0.1*[3] [ml/g] |
|---|---|
| Sample 1 | 110 |
| Sample 2 | 105 |
| Sample 3 | 100 |
| Sample 4 | 55 |
| Sample 5 | 90 |
| Sample 6 | 80 |

*[1]For nitrogen adsorption isotherm at liquid nitrogen temperature.
*[2]Value in terms of nitrogen volume under standard conditions.
*[3]Maximum in relative vapor pressure range of 0.2–0.8.

As seen from the results in Tables 1 to 3, it was confirmed that all of the porous solids obtained in Examples 1 to 6 (Samples 1 to 6) satisfied all of the following conditions.

(1) Having an X-ray diffraction pattern with at least one peak at a diffraction angle corresponding to a d value of 1 nm or greater;
(2) Having a nitrogen adsorption isotherm measured at liquid nitrogen temperature with at least one section where the change in nitrogen adsorption (nitrogen adsorption in terms of the volume of nitrogen under standard conditions) is 50 ml/g or greater with a relative vapor pressure change of 0.1 in a relative vapor pressure range of 0.2–0.8;
(3) Possessing mesopores with a median pore size of 2–50 nm in the pore size distribution curve;
(4) Having pore walls that are porous with a mean pore size of less than 2 nm;
(5) Having a total micropore volume of 0.05 ml/g or greater; and
(6) Having at least 60% of the total pore volume excluding the micropores in a range of ±40% of the median pore size.

The results in Tables 1 to 3 confirmed that when the surfactant concentration is limited to a certain level, increasing the molar ratio of the framework component/surfactant allows control of the micropore volume, pore size and pore volume.

Comparative Example 1

Figure 11:
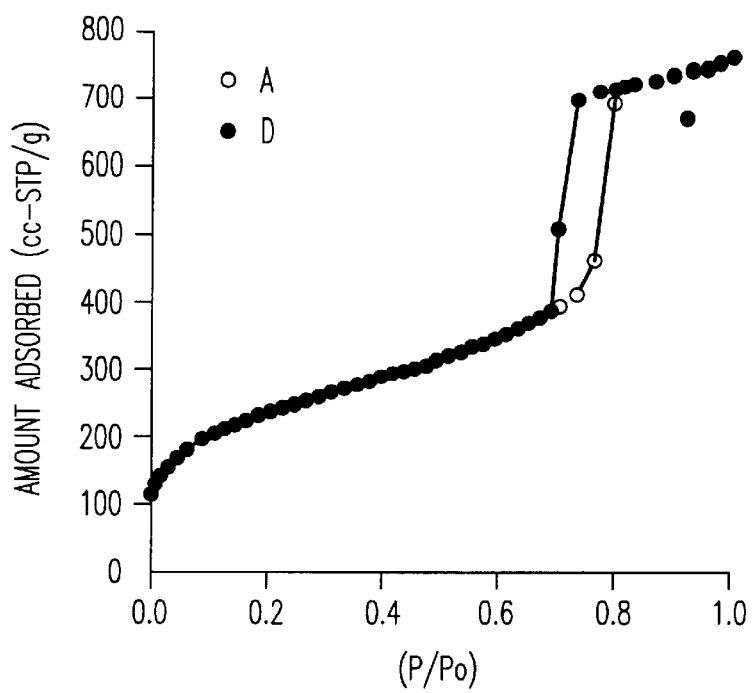
FIG. 11 is a graph of a nitrogen adsorption isotherm for a comparison sample.
Figure 12:
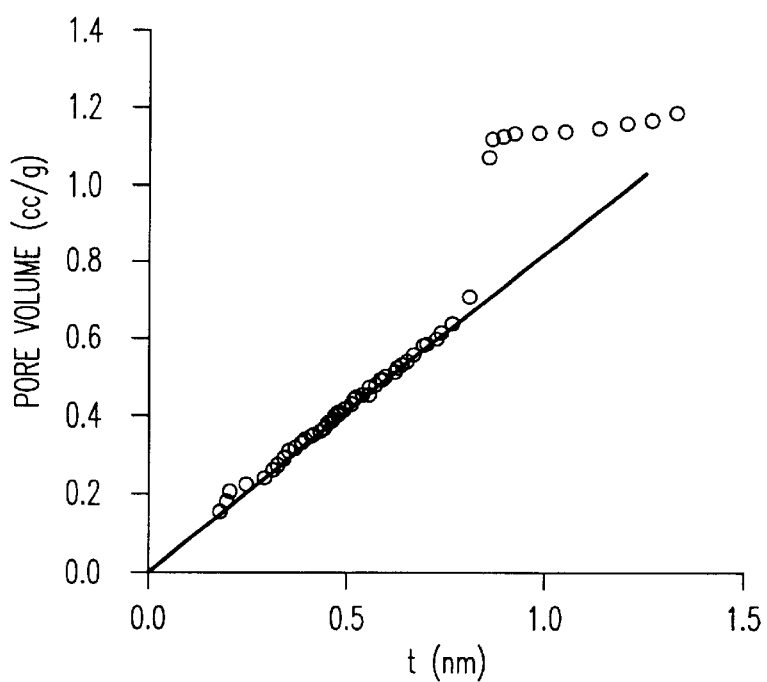
FIG. 12 is a t-plot graph of a nitrogen adsorption isotherm for a comparison sample.

A porous solid (powder) was obtained as a comparative sample 1 in the same manner as Example 1 except for using 3.56 g of P104 (surfactant concentration: 29.67 g/l), in order to confirm that the micropore formation is closely related to the surfactant concentration. This sample had a hexagonal structure based on powder X-ray diffraction, and the nitrogen adsorption isotherm was as shown in FIG. 11. The adsorption isotherm for the comparative sample 1 matched the standard curve shown in FIG. 12, and no micropores were found.

Comparative Example 2

A Porous solid (powder) was obtained as a comparative sample 2 in the same manner as Example 1, except that the stationed temperature of the mixture after agitating at 45° C. for 8 hours was 100° C., and the TEOS/P104 was 60. No micropores were found for the comparative sample 2.

Examples 7–8

Porous solids for samples a and b were obtained in the same manner as Example 1, except that the following amounts of starting materials were used.

Example 7

| | |
|---|---|
| P104 | 17.2 g |
| Ion-exchange water | 1060 mL |
| 12 N hydrochloric acid aqueous solution | 200 mL |
| TEOS | 87.8 g |

Example 8

| | |
|---|---|
| P104 | 34.4 g |
| Ion-exchange water | 1060 mL |
| 12 N hydrochloric acid aqueous solution | 200 mL |
| TEOS | 87.8 g |

Next, 30 g of the mesoporous solids of samples a and b was dispersed in 100 mL of an aqueous methanol solution diluted to 10% (v/v), and after stirring for one minute, the precipitate was collected by filtration under reduced pressure. The collected precipitate was dried in a dryer at 45° C. and compressed at a pressure of 500 kgf/cm², and the surfactant template was removed by firing at 550° C. for 6 hours under an oxygen atmosphere. Each of the fired samples was crushed with a mortar, and the powder particles were adjusted to between 150 μm and 300 μm with a sieve to prepare a gas molecule separating column packing material.

Comparative Example 3

FSM-16 was used as a comparison mesoporous solid with no micropores in the pore walls. The FSM-16 was synthesized according to an outside publication. The procedure was as follows.

After dispersing 50.0 g of sodium disilicate (.—$Na_2Si_2O_5$) in 500 mL of ion-exchange water and stirring at room temperature for 3 hours, the precipitate was collected by filtration under reduced pressure. The precipitate was dispersed in an aqueous solution of 32.0 g of hexadecyltrimethylammonium chloride dissolved in 1 liter of ion-exchange water, and after stirring for 3 hours in a hot water bath at 70° C., a 2 N hydrochloric acid aqueous solution was used to adjust the pH to 8.5. An additional 3 hours of stirring in a hot water bath at 70° C. yielded a white precipitate. The white precipitate produced was collected by reduced pressure filtration and thoroughly washed with an abundant amount of ion-exchange water, and then allowed to stand overnight in a dryer at 45° C. for drying to obtain a porous solid as Sample c.

After then compressing Sample c (FSM-16) at a pressure of 500 kgf/cm², the surfactant template was removed by firing at 550° C. for 6 hours under an oxygen atmosphere. The fired sample was crushed with a mortar, and the powder particles were adjusted to between 150 μm and 300 μm with a sieve to prepare a gas molecule separating column packing material.

[Analysis of Physical Properties, etc.]

Figures 13A, 13B:
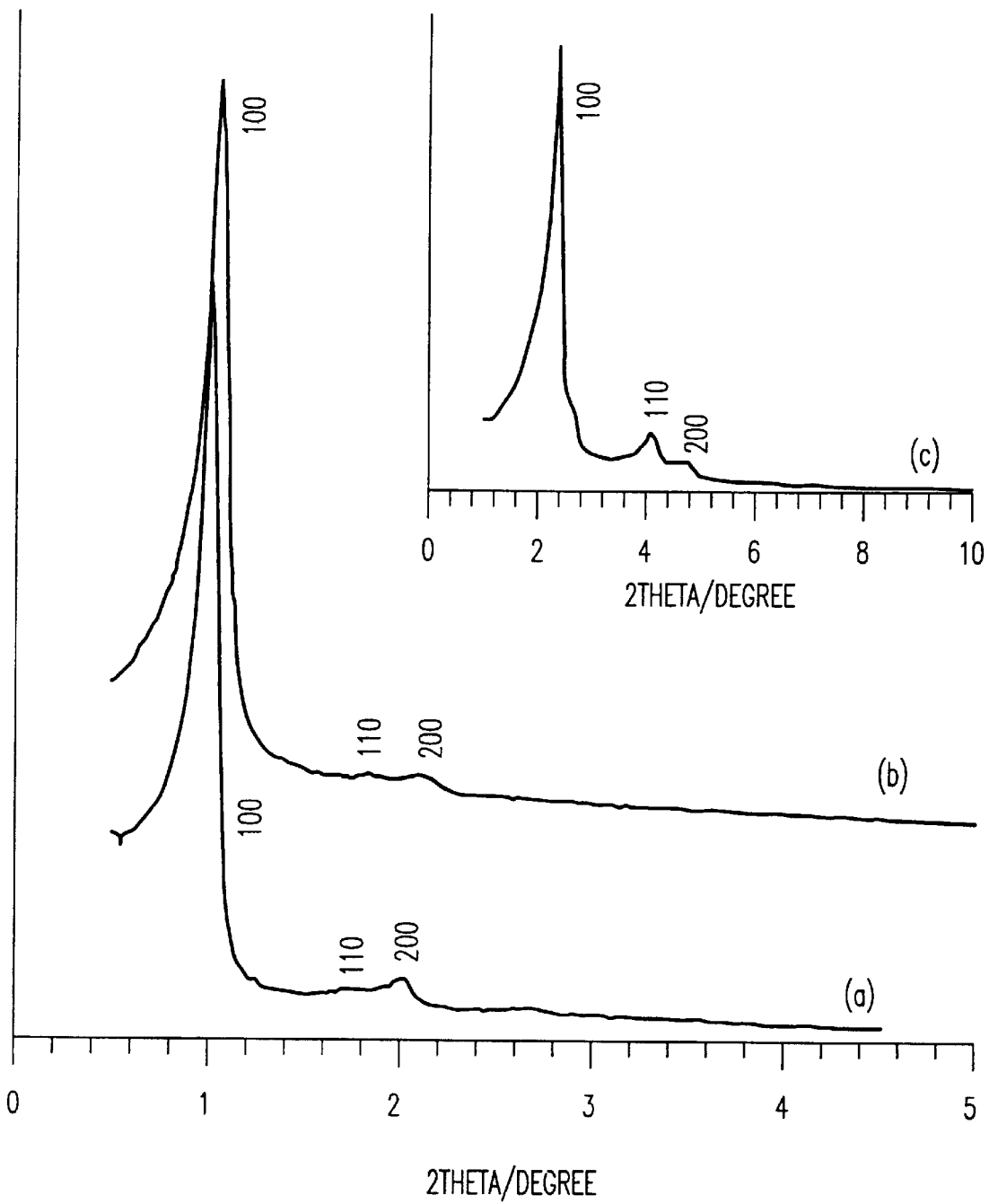
FIG. 13 is a graph showing an XRD pattern for Samples a, b and c.
Figure 14:
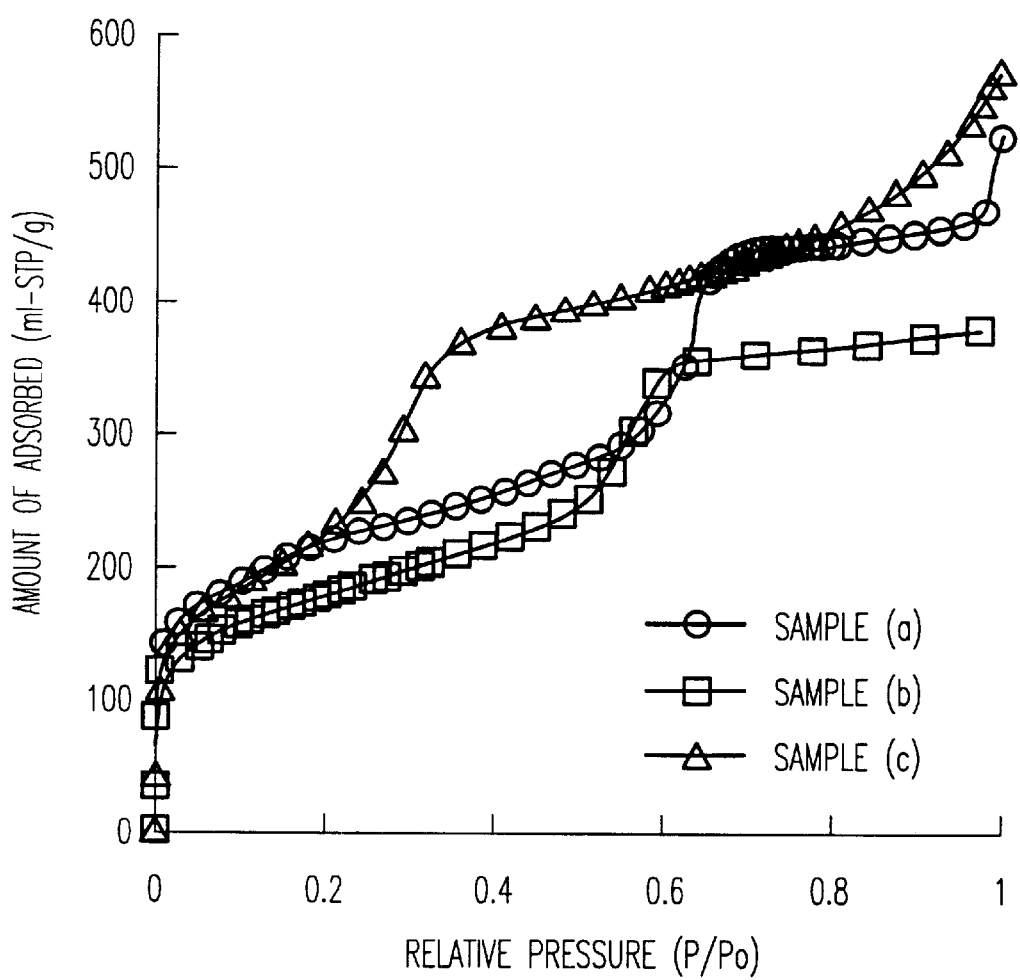
FIG. 14 is a graph showing nitrogen adsorption isotherms for Samples a, b and c.

The powder X-ray diffraction (XRD) patterns and adsorption isotherms for samples (packing materials) a, b and c obtained in Examples 7–8 and Comparative Example 3 were determined in the same manner as Example 1, and their powder X-ray diffraction (XRD) patterns and adsorption isotherms are shown in FIGS. 13 and 14, respectively. The analytical data for Samples a, b and c were obtained as in Example 1, and the results are shown in Tables 4 to 6.

As indicated by the results of the powder X-ray diffraction (XRD) pattern shown in FIG. 13, samples a, b and c each exhibited a strong peak near 1° and several weak peaks at the wide-angle end, thus confirming formation of a regular mesostructure. The observed XRD patterns also indicated that Samples a, b and c each formed two-dimensional hexagonal framework structures, and the peaks matched the diffraction peaks for (100), (110) and (200) from the low-angle end.

As clearly seen from the adsorption isotherms shown in FIG. 14 and the data shown in Tables 4 to 6, the micropore volume of Sample a was 0.110 ml/g and that of Sample b was 0.051 ml/g, but no micropores were present in Sample c. Moreover, it was confirmed that both of the porous solids (Samples a and b) obtained in Examples 7 and 8 satisfied all of the conditions listed above as (1) to (6).

TABLE 4

| Sample | Pore size (nm) | BET (m²/g) | Micropore volume (cc/g) |
|---|---|---|---|
| a | 5.73 | 729.9 | 0.110 |
| b | 4.73 | 617.9 | 0.051 |
| c | 2.57 | 865.5 | 0 |

TABLE 5

| Sample | Total pore volume excluding micropores (ml/g) | Mesopore volume* (ml/g) | Ratio (%) of mesopore volume with respect to total pore volume excluding micropores | Total pore volume (ml/g) |
|---|---|---|---|---|
| a | 0.546 | 0.456 | 83.52 | 0.728 |
| b | 0.497 | 0.406 | 81.69 | 0.591 |
| c | 0.896 | 0.570 | 63.62 | 0.896 |

*Volume within ±40% of median pore size.

TABLE 6

| Sample | Maximum value for change in nitrogen adsorption*[2] with relative vapor pressure change*[1] of 0.1*[3] [ml/g] |
|---|---|
| a | 130 |
| b | 100 |
| c | 105 |

*[1]For nitrogen adsorption isotherm at liquid nitrogen temperature.
*[2]Value in terms of nitrogen volume under standard conditions.
*[3]Maximum in relative vapor pressure range of 0.2–0.8.

[Gas Component Adsorption Separation Test]

Samples (gas separation column packing materials) a, b and c obtained in Examples 7–8 and Comparative Example 3 were used for measurement of the retention times of different gas molecules by gas chromatography (GC) under the conditions shown below, and the adsorption separation properties for the gas molecules were evaluated. As pretreatment of the packing materials before measurement, they were exposed to a helium carrier gas for 6 hours at a flow rate of 40 mL/min at 150° C., and then the packing materials were dried. The GC measurement conditions were as follows.

| Column | Glass column (2 m) |
|---|---|
| Carrier gas | Helium (40 mL/min) |
| INJ temperature | 50° C. |
| TCD temperature | 80° C. |
| Column temperature | 50° C. |

These samples (gas separation column packing materials) a, b and c were used for gas molecule adsorption separation evaluation (retention time measurement), giving the results shown in Table 7. The gas molecules used were hydrogen ($H_2$), carbon monoxide (CO), nitrogen ($N_2$), oxygen ($O_2$), nitrogen monoxide (NO) and carbon dioxide ($CO_2$) as acidic gases, and methane ($CH_4$), ethane ($C_2H_6$), propane ($C_3H_8$), n-butane (n-$C_4H_{10}$), i-butane(i-$C_4H_{10}$), ethylene ($CH_2$=$CH_2$) and propylene ($C_2$=$CHCH_3$) as hydrocarbon gases.

TABLE 7

| Gas component | Retention time (min) | | |
|---|---|---|---|
| | Sample a | Sample b | Sample c |
| $H_2$ | 1.1 | 0.9 | 0.8 |
| CO | 1.8 | 1.6 | 1.3 |
| $N_2$ | 1.6 | 1.4 | 1.2 |
| $O_2$ | 1.6 | 1.4 | 1.2 |
| NO | 1.6 | 1.4 | 1.2 |
| $CO_2$ | 10.1 | 7.5 | 4.7 |
| $CH_4$ | 2.1 | 1.8 | 1.3 |
| $C_2H_6$ | 6.9 | — | 3.3 |
| $C_3H_8$ | 27.5 | — | 11.2 |
| $n-C_4H_{10}$ | 134.4 | — | 40.0 |
| $i-C_4H_{10}$ | 108.0 | — | 33.5 |
| $CH_2=CH_2$ | 11.5 | — | 4.2 |
| $CH_2=CHCH_3$ | 104.4 | 77.9 | 16.9 |

As seen by the results shown in Table 7, Samples (gas component column packing materials) a and b obtained in Examples 7 and 8 had much longer retention times for the specific gas components than Sample c obtained in Comparative Example 3, which possessed no micropores, thus confirming their ability to efficiently and selectively accomplish adsorption separation particularly of hydrocarbon gases such as CO, $CO_2$ and propylene from other gases. The tendency for a longer retention time for the specific gas components was demonstrated to increase proportionally with the volume of micropores present in the pore walls.

Comparative Examples 4–5

For comparison, MS-3A Zeolite (Comparative Example 4) and USY Zeolite (Comparative Example 5) were used for measurement of the retention times for nitrogen monoxide (NO), carbon dioxide ($CO_2$) and propylene ($C_3H_6$) in the same manner as the above-mentioned gas component adsorption separation test. The results are shown in Table 8.

TABLE 8

| Gas type | Retention time (min.) | |
|---|---|---|
| | MS-3A | USY |
| NO | 0.73 | 1.73 |
| $CO_2$ | 1.25 | 5.18 |
| $C_3H_6$ | 0.99 | 44.13 |
| MS-3A Zeolite | Pore size: 0.3 nm, Pore volume: 0.23 cc/g, Specific surface area: 643.9 m²/g | |
| USY Zeolite | Pore size: 0.9 nm, Pore volume: 0.30 cc/g, Specific surface area: 840.0 m²/g | |

As seen by the results shown in Tables 7 and 8, Samples a and b of Examples 7–8 according to the present invention were confirmed to have retention times for carbon dioxide ($CO_2$) and propylene ($C_3H_6$) that were approximately twice those of conventional zeolite products.

As explained above, the porous solid for gas adsorption separation according to the present invention and the gas adsorption separation process of the invention which employs it allow selective and efficient adsorption separation of specific components in gases, such as hydrocarbons and $CO_2$.

The porous solid for gas adsorption separation of the invention is therefore highly effective as an adsorbent for temporary adsorption of hydrocarbons in exhaust gas during engine starting (cold starting) and then release of the hydrocarbons when the catalyst warms to an activation temperature, as an adsorbent for removing impurities such as CO and $CO_2$ in hydrogen produced by reforming hydrocarbons, as an adsorbent in apparatuses for separation and recovery of $CO_2$ in fuel exhaust gas or chemical plant processing gas by pressure swing absorption (PSA), or as an adsorbent for solvent recovery apparatuses.

What is claimed is:

1. A porous solid for gas adsorption separation;
    having an X-ray diffraction pattern with at least one peak at a diffraction angle corresponding to a d value of 1 nm or greater; and
    having a nitrogen adsorption isotherm measured at liquid nitrogen temperature with at least one section where a change in nitrogen adsorption in terms of the volume of nitrogen under a standard condition is 50 ml/g or greater with a relative vapor pressure change of 0.1 in a relative vapor pressure range of 0.2–0.8;
    wherein said porous solid possesses mesopores with a median pore size of 2–50 nm in a pore size distribution curve and pore walls that are porous.

2. The porous solid for gas adsorption separation according to claim 1, wherein said pore walls have micropores with a mean pore size of less than 2 nm.

3. The porous solid for gas adsorption separation according to claim 2, wherein the total volume of said micropores is 0.05 ml/g or greater.

4. The porous solid for gas adsorption separation according to claim 2, wherein at least 60% of the total pore volume excluding said micropores is in a range of ±40% of said median pore size.

5. The porous solid for gas adsorption separation according to claim 2, wherein the mean size of said micropores is at least 0.2 nm and less than 2 nm.

6. The porous solid for gas adsorption separation according to claim 2, wherein the median pore size of said mesopores is from 3 nm to 30 nm.

7. The porous solid for gas adsorption separation according to claim 2, wherein the total volume of said micropores is at least 10% of the total pore volume.

8. The porous solid for gas adsorption separation according to claim 1, wherein the thickness of said pore walls is 2 nm or greater.

9. The porous solid for gas adsorption separation according to claim 1, wherein said porous solid comprises an organic/inorganic hybrid-based framework.

10. A gas adsorption separation process whereby adsorption separation of components in a gas is accomplished by contacting the gas with a porous solid having an X-ray diffraction pattern with at least one peak at a diffraction angle corresponding to a d value of 1 nm or greater; and
    having a nitrogen adsorption isotherm measured at liquid nitrogen temperature with at least one section where the change in nitrogen adsorption in terms of the volume of nitrogen under standard conditions is 50 ml/g or greater with a relative vapor pressure change of 0.1 in a relative vapor pressure range of 0.2–0.8;
    wherein said porous solid possesses mesopores with a median pore size of 2–50 nm in the pore size distribution curve and pore walls that are porous.

11. The gas adsorption separation process according to claim 10, wherein said pore walls have micropores with a mean pore size of less than 2 nm.

12. The gas adsorption separation process according to claim 11, wherein the total volume of said micropores is 0.05 ml/g or greater.

13. The gas adsorption separation process according to claim 11, wherein at least 60% of the total pore volume excluding said micropores is in a range of ±40% of said median pore size.

14. The gas adsorption separation process according to claim 11, wherein the mean size of said micropores is at least 0.2 nm and less than 2 nm.

15. The gas adsorption separation process according to claim 11, wherein the median pore size of said mesopores is from 3 nm to 30 nm.

16. The gas adsorption separation process according to claim 11, wherein the total volume of said micropores is at least 10% of the total pore volume.

17. The gas adsorption separation process according to 10, wherein the thickness of said pore walls is 2 nm or greater.

18. The gas adsorption separation process according to claim 10, wherein said components in the gas include one or more components selected from the group consisting of carbon dioxide and hydrocarbons.

19. The gas adsorption separation process according to claim 10, wherein said porous solid comprises an organic/inorganic hybrid-based framework.

* * * * *